INVENTOR.
JAN A.C.KORVER

BY
Frank R. Jifani

AGENT

INVENTOR.
JAN A.C.KORVER
BY
[signature]
AGENT

INVENTOR.
JAN A.C.KORVER
BY
[signature]
AGENT

United States Patent Office 3,441,958

Patented Apr. 29, 1969

3,441,958

SATURABLE REACTOR PINCUSHION CORRECTION CIRCUIT

Jan Abraham Cornelis Korver, Emmasingel, Eindhoven, Netherlands, assignor to U.S. Philips Corporation, New York, N.Y., a corporation of Delaware Filed Feb. 9, 1967, Ser. No. 614,895
Claims priority, application Netherlands, Feb. 19, 1968, 6602180
Int. Cl. H01j *29/70*
U.S. Cl. 315—27 10 Claims

ABSTRACT OF THE DISCLOSURE

A television deflection circuit including a saturable core reactor having first and second windings arranged thereon to reduce pin cushion distortion and further including a third winding arranged on the core and magnetically coupled to a first one of said windings so as to compensate for any distortion introduced into the deflection waveform by the varying inductance of said first winding during the stroke portion of the deflection waveform.

The present invention relates to a circuit arrangement for correcting pin cushion distortion in the deflection of an electron beam in a display tube that is deflected in two orthogonal directions. This type of circuit arrangement comprises a first deflection coil for deflection in a first direction at a comparatively high frequency, preferably in the line direction. This coil is energized by means of a first source of sawtooth current. In parallel with the coil is a first winding provided on a transductor core having a non-linear magnetic inductance (B)—magnetic field intensity (H) curve. The circuit further comprises a second deflection coil for deflection in a second direction at a frequency which is fairly low compared with the first-mentioned frequency, preferably in the field direction. The second coil is energized by means of a second source of saw-tooth current which passes at least partly through a second winding provided on the transductor core.

The above circuit arrangement has been proposed in U.S. patent application, Ser. No. 505,540, filed Oct. 28, 1965 and assigned to the assignee of the present application. In this circuit arrangement, due to the nonlinear magnetic inductance (B)—magnetic field intensity (H) curve of the transductor core, an inductance varying with the sawtooth current is present in the output circuit of the two sources supplying the sawtooth currents. Especially the varying inductance in the output circuit of the source supplying the sawtooth current of fairly low repetition frequency, that is the field deflection stage, is considerably affected adversely.

This is due to the fact that a negative feedback circuit is usually required in order to produce a sawtooth current of field frequency of adequate linearity. In principle, either of two negative feedback systems may be chosen, i.e. negative current feedback or negative voltage feedback.

Negative current feedback is, however, not preferred, since this usually requires an additional tube with component parts to operate as a driver for the field output stage. A negative current feedback circuit is thus costly. However, negative current feedback has the advantage that the output current is kept substantially constant so that the varying inductance in the output circuit of the field output stage is not a source of trouble.

Negative voltage feedback requires fewer components so that it is cheaper, but it has the disadvantage that by keeping the output voltage constant, the varying inductance deforms the sawtooth current. Since negative voltage feedback is primarily employed for improving the linearity of the sawtooth, it is self evident that this situation is undesirable. In general, even if negative feedback was not used, the varying inductance would affect the waveform of the current when a source of low internal resistance is used, for example, when a triode is used as an amplifying tube in a field output stage. Even if the control signal for the triode were of an ideal waveform, the output current would nevertheless exhibit a non-linear departure.

In accordance with the invention, the drawback that the varying inductance produces a non-linear deformation of the sawtooth current of comparatively low repetition frequency is overcome by providing the transductor core with a third winding which is fixedly coupled with the second winding and which is included in the control circuit of an amplifying element forming part of the second source. The third winding is wound in a sense such that the voltage produced across it, subsequent to the addition thereof to a sawtooth control voltage applied to said amplifying element, causes the output voltage of the amplifying element to vary so that the influence of the varying inductance of the second winding is obviated.

A few possible embodiments of circuit arrangements according to the invention will be described with reference to the accompanying figures, in which:

FIGS. 1 and 1*a* show a first embodiment having a simple negative voltage feedback.

Figure 1:
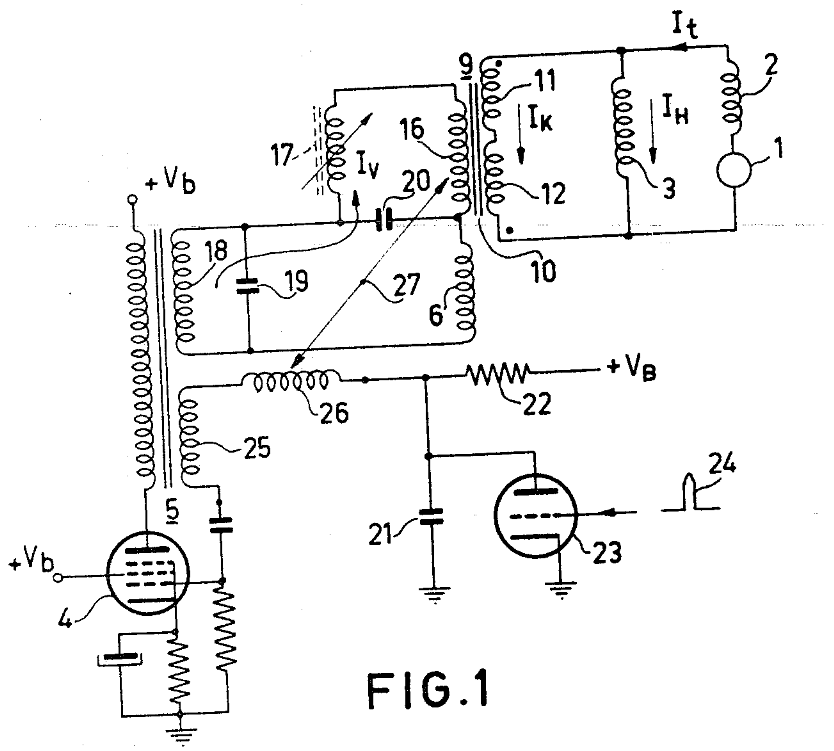

Referring to FIG. 1, reference numeral 1 designates the line generator having an internal impedance to be considered as an inductance 2. This generator supplies the horizontal deflection current $I_H$ for the line deflection coils 3. Reference numeral 4 designates the source supplying the field deflection current, which is supplied through the field output transformer 5 to the field deflection coils 6.

A transductor 9 is electrically connected to the line deflection coils 3 and the field deflection coils 6. The transductor 9 comprises a core 10 having a non-linear magnetic inductance (B)—magnetic field intensity (H) curve. The core 10 is provided with a first winding 11, 12 and a second winding 16. The first winding 11, 12 is connected in parallel with the horizontal or line deflection coil 3. The second winding 16, together with the inductance 17 to be varied, is connected in series with the vertical or field deflection coil 6 and connected to the secondary winding 18 of the transformer 5. The secondary winding 18 is shunted by a large capacitor 19, which serves as a short-circuit for the signals of line frequency which penetrate through the transductor 9 into the vertical deflection circuit.

The source 1 supplies, in fact, a sawtooth current $I_t$. This current splits up into the horizontal deflection current $I_H$ through the deflection coil 3 and into a current $I_K$ through the first winding 11, 12. Owing to the series combination of the inductances 6, 16 and 17, the sawtooth field deflection current $I_V$ will flow through these three inductors.

The series combination of the inductances 16 and 17 is shunted by a capacitor 20. The operation of the transductor 9 having the windings 11, 12 and 16 and the associated capacitor 20 is extensively described in U.S. Patent application Ser. No. 505,540. The inductance 17 is variable, but once adjusted, it has an inductance value which is independent of the current $I_V$ passing through it.

In order to pass a sawtooth current through the deflection coil 6, a sawtooth signal is applied to the control grid of the tube 4. In the circuit arrangement of FIG. 1, the sawtooth signal is produced in a very simple manner by charging a capacitor 21 through a resistor 22 from a voltage supply source $V_B$ and by discharging it periodically by means of a triode 23. For this purpose, pulses 24 are applied to the control grid of the triode 23 having a polarity such that the triode 23 is made to conduct. The control circuit of the tube 4 includes a negative feedback winding 25 provided on the core of the transformer 5 in order to improve the linearity of the sawtooth current produced. The coil 25 is wound so that the voltage induced is in phase opposition to the voltage produced across the capacitor 21. Therefore, said negative feedback improves the linearity of the sawtooth current. In practice, the degree of negative feedback is so high that, when the amplitude of the signal across the capacitor 21 is assumed to be unity, the amplitude of the signal across the winding 25 is about $\frac{9}{10}$ thereof. Consequently, the control grid of the tube 4 finally receives a control signal having an amplitude not more than $\frac{1}{10}$ of the voltage across the capacitor 21. With reference to the substitute diagram of FIG. 3, it will be explained more fully hereafter that due to the second winding 16 in the output circuit of the tube 4, a deformation of the sawtooth current $I_V$ is produced. In order to counteract this deformation a third winding 26 is provided on the transductor core 9 in accordance with the invention, said winding being fixedly coupled with the second winding 16, as is indicated by the double arrow 27.

Figures 2, 3, 4:
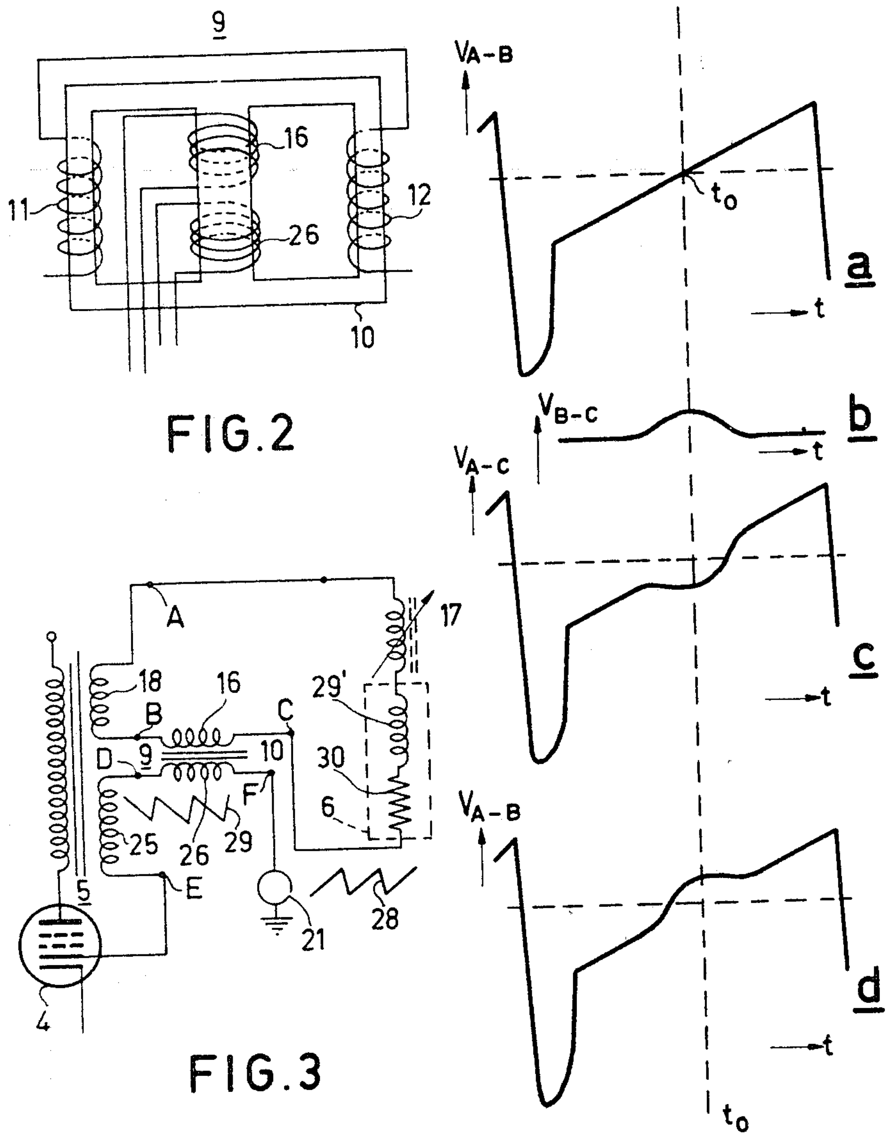
FIG. 2 shows the transductor core having a first, a second and a third winding.
FIG. 3 shows a simplified diagram of FIG. 1 for explaining the operation of the arrangement.
FIG. 4 shows a few sawtooth voltages for explaining the non-linear deformation thereof due to the varying inductance in the output circuit of the field output stage.

The transductor 9 is shown in detail in FIG. 2. The core 10 comprises two side limbs provided with the windings 11 and 12, wound in relatively opposite sense. These windings are connected in series with each other and thus form the first winding 11, 12. The central limb of the transductor 10 is provided with the second winding 16 and with the third winding 26 so that the condition of the fixed magnetic coupling of the second and third windings 16 and 26, respectively, is fulfilled. As an alternative, the first winding 11, 12 may be wound on the central limb and the windings 16 and 26 may be uniformly arranged on the two side limbs, provided that the windings 16 and 26 are fixedly coupled magnetically with each other.

FIG. 3 shows a substitute diagram of the arrangement of a part of FIG. 1 for explaining the waveform deformation involved and its suppression by means of the winding 26.

It will be apparent from FIG. 3 which elements of the arrangement of FIG. 1 are omitted and which elements are replaced. In the first place, the capacitor 21 is represented by a source 21 which supplies a sawtooth control voltage 28. The deflection coils 6 are represented by means of an inductor 29' and a resistor 30 considered to be the ohmic resistance of the deflection coil 6. The third winding 16 and the deflection coil 6 are interchanged. This may be done without any objection, since the capacitors 19 and 20 are provided to reduce the interaction of the horizontal deflection stage on the vertical deflection stage. However, this action is unessential for the phenomenon to be described hereinafter. It is therefore not necessary to take the capacitors 19 and 20 into account and only the series combination of the elements 6, 16 and 17 is important. This series combination is connected to the winding 18. In a series combination two elements may be interchanged without the effect being varied, which is the case in FIG. 3 as compared with FIG. 1.

Only the second winding 16 and the third winding 26 of the transductor 9 are shown, since only these two windings are important in the following explanation. FIG. 3 also shows the sawtooth voltage 29 appearing across the winding 25. From this figure it is apparent that the control-signals 28 and 29 are in phase opposition, and, as stated above, the amplitude of signal 29 is $\frac{9}{10}$ of the amplitude of the signal 28. FIG. 4 shows that the voltage across the winding 18 includes pulses superimposed on the signal 29. These pulses are omitted from FIG. 3 for the sake of clarity.

If the winding 26 were not provided, a voltage $V_{AB}$ as shown in FIG. 4*a* is produced across the winding 18. This voltage comprises pulses and a sawtooth portion. For a comparatively low field frequency of 50 or 60 Hz., the impedance of the resistor 30 predominates with respect to the inductances of the circuit. During the flyback time the inductances of the circuit will play a part and cause pulses to appear. For the following explanation, however, only the sawtooth portion is important.

If between the points A and B only a pure sawtooth voltage were operative, a voltage $V_{BC}$ as shown in FIG. 4*b* would occur across the varying inductance 16. This may be accounted for as follows. The core 10 of the transductor 9 has a non-linear magnetic inductance (B)—magnetic field intensity (H) curve. As a result of the non-linear characteristic curve, for low currents the inductance of the windings on the core 10 is high, whereas for high currents it is low. Since the current passing through the circuit formed by the elements 6, 16 and 17 is an alternating current, it will be zero at the centre $t_0$ of a vertical stroke, whereas on either side thereof it will increase to a given maximum value. The inductance of the winding 16 at the instant $t_0$ will therefore be high, whereas on either side thereof it will decrease. The voltage drop across the winding 16 at the instant $t_0$ is therefore at a maximum, whereas on either side of $t_0$ it decreases. This accounts for the appearance of the voltage $V_{BC}$. If the voltage $V_{AB}$ has the waveform of FIG. 4*a*, the voltage $V_{BC}$ across the winding 16 will cause the voltage $V_{AC}$ between the points A and C to assume the waveform illustrated in FIG. 4*c*. Since this is the voltage which appears across the series combination of the elements 6 and 17, and since the inductances 17 and 29' may be considered to be constant inductances, and the resistor 30 may be considered to have a constant resistance, the waveform of the voltage $V_{AC}$ of FIG. 4*c* will produce a current through the deflection coil 6 which is not a pure sawtooth current, but which will have the waveform of FIG. 4*c* during the stroke.

In order to counteract this non-linear waveform deformation, the voltage $V_{AB}$ should have, in accordance with the invention, the waveform of FIG. 4*d*. If the voltage $V_{BC}$ of FIG. 4*b* is subtracted from the voltage $V_{AB}$ of FIG. 4*d*, a sawtooth voltage is left between the points A and C which will produce a pure sawtooth current through the deflection coil 6.

This may be achieved in a simple manner by adding to the sawtooth control voltage 28 the voltage waveform of FIG. 4*b*. This is obtained by providing the winding 26, which is fixedly coupled magnetically with the winding 16. Since the voltage $V_{BC}$ is produced across the winding 16, a voltage of the same waveform will be induced in the winding 26. The polarity of the latter voltage is determined by the sense of winding of the winding 26. From FIG. 4*d* it will be apparent that the voltage $V_{BC}$ has to be added to the sawtooth voltage, and this is also the case in the control grid circuit of the tube 4. The polarity of the voltage induced in the winding 26 must therefore be the same as that of the control signal 28. However, since the voltage 29 produced across the winding 25 is in phase opposition to the voltage 28, the voltage across the winding 26 will be in phase opposition to that of the winding 25. In other words, the correction voltage to be introduced via the winding 26 into the control-grid circuit has to be added to the control-voltage 28 or, which is the same, it has to be subtracted from the negative feedback voltage 29.

In order to obtain the correct ratio between the various voltages, the transformation ratio between the windings 16 and 26 and between the windings 18 and 25 have to be equal to each other. This may be accounted for as follows. The purpose aimed at can be obtained if the voltage between the points A and C has the same waveform as the voltage between the points E and F. This can be achieved by subtracting from the voltage $V_{AB}$ across the winding 18 a proportionally equal voltage, as from the voltage $V_{DE}$ across the winding 25. Therefore, if the transformation ratio between the windings 18 and 25 is *n*, the transformation ratio between the windings 16 and 26 must be equal to *n*, since the aforesaid condition of proportionality then is satisfied.

Figure 1A:
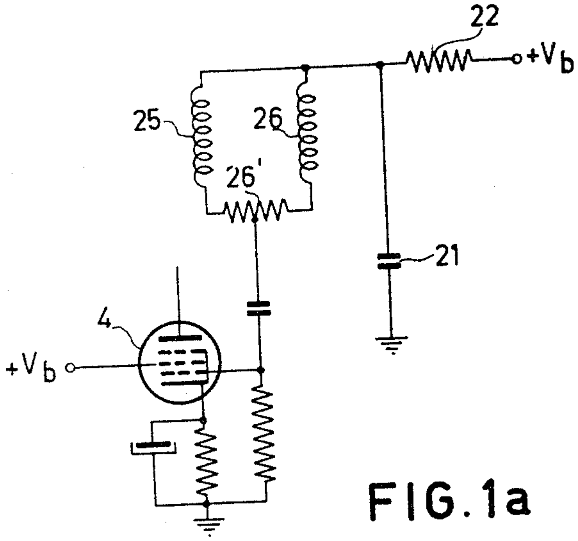

Although in the foregoing discussion reference is made only to a series connection, it will be obvious that a parallel combination is also possible. If the winding 16 is not connected in series with the elements 6 and 17, but is connected in parallel therewith, its influence in the anode circuit of the tube 4 may also be obviated by connecting the winding 26 in parallel with the winding 25. This has to be carried out, as is shown in FIG. 1*a*, so that the junction of the winding 26 is not connected to the resistor 22, but is connected through an adding resistor 26' to the end of the winding 25. The voltages across the windings 25 and 26 are added to each other via the resistor 26' and applied from a central tapping of the resistor 26' and through a coupling capacitor to the control grid of the tube 4. Also in this case the negative feedback voltage will be affected so that the influence of the winding 16 on the anode circuit is suppressed.

In the embodiment shown in FIG. 3, we have not considered the fact that the voltage produced across the winding 25 includes pulses and that a correct adjustment of the tube 4 does not require a pure sawtooth signal. Nor have we considered that to this sawtooth control signal a parabolic and a so-called S-shaped signal component have to be added, as is described in a prior copending U.S. Patent application, Ser. No. 537,096, filed March 24, 1966. In the detailed embodiment shown in FIG. 5, the required parabolic and S-shaped components are introduced into the control signal for the tube 4. Since the arrangement of FIG. 5 operates, with respect to the introduction of said parabolic and S-components, similarly to that described in the aforesaid copending application, the part of the arrangement of FIG. 5 that deals with the introduction of said components will be described only with regard to the provision of the third winding 26.

The provision of the winding 26 involves the disadvantage that the interlace of the vertical deflection may be disturbed, since the winding 26 is also wound on the transductor core 10, on which the first winding 11, 12 also is provided. The winding 11, 12 is traversed by a current $I_K$ at the line frequency, which will introduce line fly-back pulses into the winding 26. If these line fly-back pulses are not removed from the control circuit of the tube 4, they might disturb the interlace of the vertical deflection. The line fly-back pulses are therefore suppressed from this control-circuit by providing an integrating network. The integrating network comprises the resistors 31, 32 and the capacitor 33. The time constant of the network 31, 32, 33 is high with respect to the time period of the line fly-back pulses so that a voltage comprising only components of the field frequency, resulting from the voltage induced into the winding 26, will appear across the capacitor 33.

As stated above, the voltage induced in the winding 25 comprises not only the desired saw-tooth component, but also pulsatory components, which have to be removed by means of a so-called peaking network. This network is formed, as is known, by a resistor-capacitor network. In the arrangement shown in FIG. 5, the peaking network is formed by the ressitors 31, 32 and the capacitor 34. The resistors 31 and 32 therefore have a double function, i.e. removing the line fly-back pulses by co-operation with the capacitor 33, and removing the pulses from the negative feedback voltage by co-operation with the capacitor 34. This double function can be fulfilled by an appropriate choice of the values of the capacitors 33 and 34. These values are as follows:

Resistor 31—100 K ohms
Resistor 32—a variable resistor of 100 K ohms
Capacitor 33—100 pf.
Capacitor 34—10 nf.

The voltage produced across the capacitor 34 is dependent upon the voltages induced in the windings 25 and 26. The capacitor 21 has produced across it a more or less sawtooth voltage, from which the voltage across the capacitor 34 is subtracted so that this voltage operates, in fact, as a negative feedback voltage. However, this voltage includes the voltage induced in the winding 26, so that to this negative feedback voltage it also applies that the deesired correction involved in the presence of the winding 16 is introduced into the control signal for the tube 4

Figure 5:
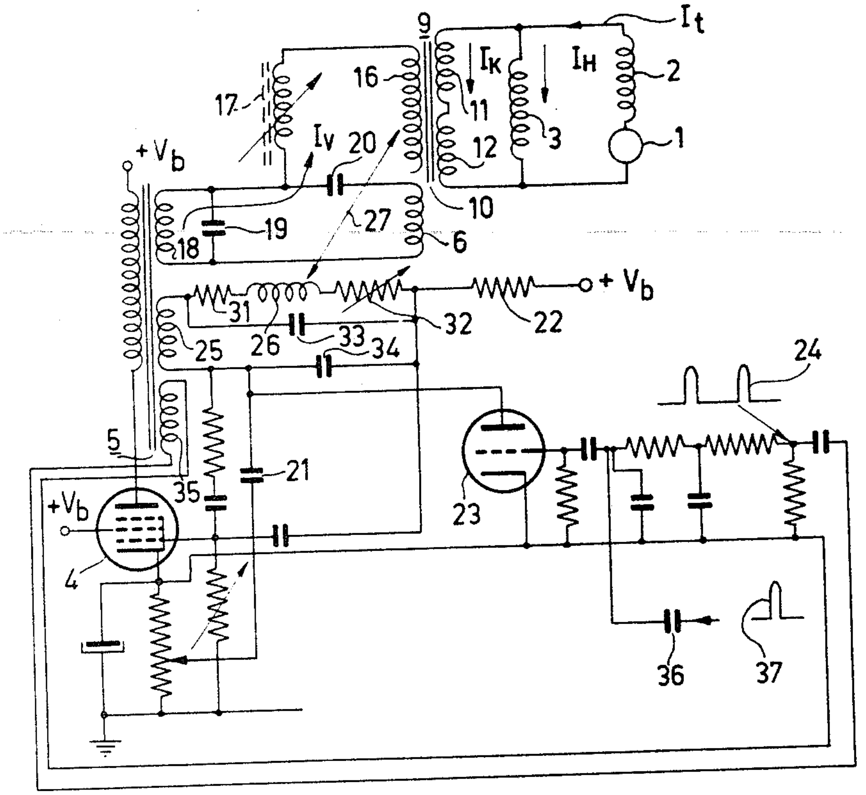
FIG. 5 shows further details of the embodiment of the arrangement shown in FIG. 1.

For the sake of completeness, it is shown in FIG. 5 that the overall field deflection stage operates on the so-called self-oscillating principle. The output circuit of he tube 4 is negatively fed back, through a further winding 35 on the transformer 5, to the input circuit of the triode 23. The input circuit of the tube 23 thus receives trigger pulses 24, which release this tube periodically. FIG. 5 furthermore shows that field synchronizing pulses 37 are applied via the capacitor 36 to provide synchronisation of the self-oscillating arrangement.

Figure 6:
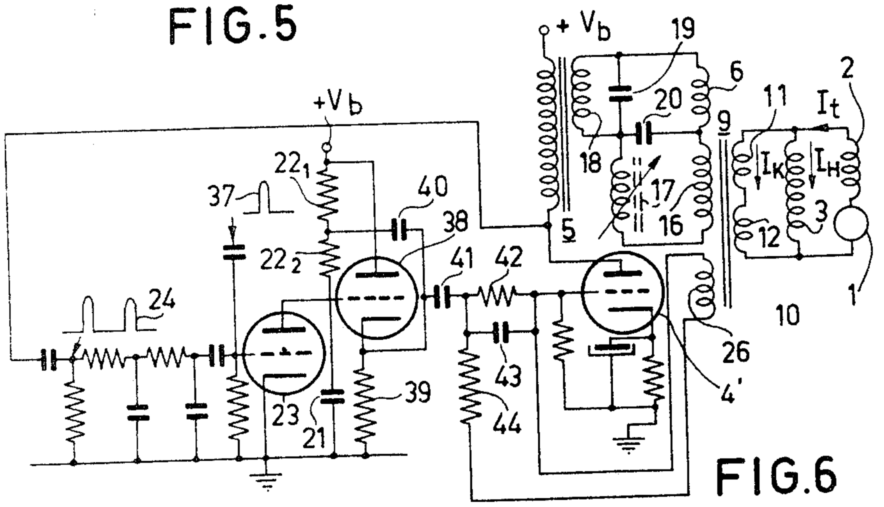
FIG. 6 shows a second embodiment in which, in fact, no negative voltage feedback is used.

FIG. 6 finally shows a circuit arrangement in which negative feedback voltages are not used and in which the output tube of the field deflection stage is formed by a triode 4'. Such a triode has, as is known, a comparatively low internal resistance, so that due to the presence of the varying inductance 16 in the anode circuit of this tube, the phenomenon of the waveform deformation described with reference to FIG. 4 will appear. In the circuit arrangement shown in FIG. 6, a bootstrap stage comprising a triode 38, a cathode resistor 39 and a coupling capacitor 40 ensures that the voltage produced across the cathode resistor 39 is substantially a sawtooth voltage. This sawtooth voltage is applied via the capacitor 41 and a network comprising a resistor 42 and a capacitor 43 to the control grid of the tube 4' so that, if the winding 16 were not provided, a substantially sawtooth current would flow through the deflection coils 6. Also in this case the required parabolic and S-shaped signal components are left out of consideration. They may be introduced, as in FIG. 5 or in a different known manner, into the control signal for the tube 4.

The voltage induced in the winding 26 has the waveform shown in FIG. 4. This voltage is added to the sawtooth control voltage derived from the cathode resistor 39. In order to ensure that the line fly-back pulses induced in the winding 26 do not affect the control grid circuit of the tube 4', an integrating network comprising a resistor 44 and a capacitor 43 is provided.

It should finally be noted that, although the arrangements described above invariably comprise amplifying tubes, transistors or other amplifying elements may be employed for carrying out the principle of the invention. Also in this case the presence of the winding 16 may give rise to non-linear deformation due to negative voltage feedback. The non-linear deformation may also be suppressed by the provision of a winding 26.

What is claimed is:

1. A cathode ray tube circuit for correcting pin cushion distortion of an electron beam deflected in two orthogonal directions comprising, a first deflection coil for deflecting the beam in a first direction at a comparatively high frequency, a first source of sawtooth current of said high frequency, means for coupling said first coil to said first current source, a transductor core having a non-linear magnetic BH curve, first and second windings wound on said core, means connecting said first winding in parallel with said first deflection coil, a second deflection coil for deflecting the beam in a second direction at a frequency which is comparatively low with respect to said high frequency, a second source of sawtooth current which includes an amplifier having a control circuit, means for coupling said second deflection coil and said second transductor winding to said second current source so that the sawtooth current supplied to said second coil flows at least partly through said second winding of the transductor core, said second winding being subject to a variation in inductance as the current varies, means for applying a sawtooth control voltage to said amplifier control circuit, a third winding wound on said core and fixedly coupled with the second winding, and means connecting said third winding in the control circuit of said amplifier, said third winding being wound in a sense such that the voltage produced across it, subsequent to the addition to said sawtooth control voltage, varies the output voltage of the amplifier so as to compensate the influence of the varying inductance of the second winding.

2. A circuit as claimed in claim 1 further comprising feedback coupling means between the output and the input of said amplifier for coupling a strong negative feedback voltage from the output to the input of the amplifier, said third winding being wound in a sense such that the voltage produced across it is in phase opposition to the negative feedback voltage at the amplifier input.

3. A circuit as claimed in claim 2 further comprising a transformer coupled to the output circuit of said amplifier, a negative feedback winding, which forms a secondary winding of said transformer, for deriving said negative feedback voltage, said transformer having a tertiary winding, means for coupling the second deflection coil to said tertiary winding, means connecting the third winding in series with the negative feedback winding, the transformation ratio between the second and third windings of the transductor being equal to the transformation ratio between the tertiary and secondary windings of the transformer.

4. A circuit as claimed in claim 1 further comprising an integrating network having a time constant that is high compared with the period of the high frequency sawtooth current, and means for applying the voltage derived from the third winding to the control circuit of the amplifier by means of said integrating network.

5. A circuit as claimed in claim 4, further comprising a peaking network comprising at least one resistor and a capacitor, for eliminating the pulses included in the negative feedback voltage, and wherein the integrating network also comprises at least one resistor and a capacitor, the resistor of the peaking network being the same as that of the integrating network.

6. A cathode ray tube beam deflection system comprising, first and second deflection coils for deflecting the electron beam in the horizontal and vertical directions, respectively, a first source of sawtooth current of the horizontal deflection frequency, means for coupling said first deflection coil to said first current source, a transductor comprising a magnetic core and first and second windings wound thereon, means connecting said first transductor winding in parallel with said first deflection coil, a second source of sawtooth current of the vertical deflection frequency that includes an amplifier having input and output means, means for coupling said output means of said second current source to said second deflection coil and to said second transductor winding so that a sawtooth current flows in said second transductor winding of a magnitude to vary the inductance thereof, a third winding wound on said transductor core and magnetically coupled with said second transductor winding, means for coupling said third winding to the input means of said amplifier, and means for coupling a sawtooth voltage to said amplifier input means that combines with the voltage induced in said third winding to control the amplifier so that it produces a distorted output waveform that compensates for the distortion produced by the varying inductance of said second transductor winding.

7. A deflection system as claimed in claim 6 further comprising means for coupling a negative feedback voltage from the output to the input of said amplifier, said third winding being wound so that the voltage induced therein is in phase opposition to said negative feedback voltage.

8. A deflection system as claimed in claim 6 further comprising a transformer having a primary winding coupled to said amplifier output means and a secondary winding connected in series with said third transductor winding to said amplifier input means.

9. A deflection system as claimed in claim 6 further comprising means for serially connecting said second deflection coil and said second transductor winding to the amplifier output means.

10. A deflection system as claimed in claim 6 wherein said amplifier output means includes a transformer having a primary winding coupled to the output terminal of the amplifier and first and second secondary windings, means connecting said second deflection coil and said second transductor winding in series across said first secondary winding, and means connecting said second secondary winding in series opposition with said third transductor winding to said amplifier input means.

No references cited.

RODNEY D. BENNETT, Jr., *Primary Examiner.*

J. G. BAXTER, *Assistant Examiner.*

U.S. Cl. X.R.

315—24

PO-1050
(5/69)

UNITED STATES PATENT OFFICE
CERTIFICATE OF CORRECTION

Patent No. 3,441,958 Dated April 29, 1969

Inventor(s) JAN A. C. KORVER

It is certified that error appears in the above-identified patent and that said Letters Patent are hereby corrected as shown below:

Column 1, line 7, "February 19, 1968" read -- February 19, 1966 -- ; Column 5, line 74, "ressitors" read -- resistors -- ; Column 6, line 21, "deesired" read -- desired -- ; Column 6, line 23, after "4" insert a period (-- . --) ; Column 6, line 26, "he" read -- the--; Column 6, line 53, "4" read -- 4' -- ; Column 6, line 55, "4" read -- 4b -- ;

Signed and sealed this 2nd day of September 19 69.

SIGNED AND SEALED

SEP 2 - 1969

(SEAL)
Attest:

Edward M. Fletcher, Jr.
Attesting Officer

WILLIAM E. SCHUYLER, JR.
Commissioner of Patents